United States Patent
Wingfors et al.

(10) Patent No.: US 9,645,916 B2
(45) Date of Patent: May 9, 2017

(54) PERFORMANCE TESTING FOR BLOCKS OF CODE

(71) Applicant: Apple Inc., Cupertino, CA (US)

(72) Inventors: Joar Wingfors, Campbell, CA (US); Andrew J. Nesbitt, Cupertino, CA (US); Brent Robert Shank, San Jose, CA (US); Brooke KaleoOKalani Callahan, Santa Cruz, CA (US); Kevin Charles Milden, Oxnard, CA (US); Maxwell Oliver Drukman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/577,806

(22) Filed: Dec. 19, 2014

(65) Prior Publication Data
US 2015/0347282 A1    Dec. 3, 2015

Related U.S. Application Data

(60) Provisional application No. 62/005,973, filed on May 30, 2014.

(51) Int. Cl.
  *G06F 9/44* (2006.01)
  *G06F 11/36* (2006.01)
  *G06F 11/34* (2006.01)

(52) U.S. Cl.
  CPC ...... *G06F 11/3688* (2013.01); *G06F 11/3692* (2013.01); *G06F 11/3409* (2013.01); *G06F 11/3452* (2013.01); *G06F 2201/865* (2013.01)

(58) Field of Classification Search
  None
  See application file for complete search history.

(56) References Cited

U.S. PATENT DOCUMENTS

| | | | |
|---|---|---|---|
| 5,764,243 A | 6/1998 | Baldwin | |
| 5,802,017 A | 9/1998 | Sato et al. | |
| 6,067,643 A | 5/2000 | Omtzigt | |
| 6,092,097 A | 7/2000 | Suzuoka | |
| 6,301,701 B1 * | 10/2001 | Walker | G06F 11/3688 717/125 |
| 6,313,838 B1 | 11/2001 | Deering | |

(Continued)

OTHER PUBLICATIONS

"Method for greatly increasing the quality and usefulness of automated performance testing results", An IP.com Prior Art Database Technical Disclosure, Jan. 20, 2011, 3 pages.

(Continued)

*Primary Examiner* — Qamrun Nahar
(74) *Attorney, Agent, or Firm* — Fish & Richardson P.C.

(57) ABSTRACT

Systems, methods, and computer-readable storage media for testing performance of blocks of code. A system can first receive a request to run a performance test for a selected portion of code in an application. Next, the system can obtain a baseline performance test result corresponding to the performance test for the selected portion of code in the application, and run the performance test for the selected portion of code in the application. The system can then generate a performance test result based on the performance test and the baseline performance test result. The system can also present the test result and/or the baseline performance test result via a graphical user interface.

22 Claims, 15 Drawing Sheets

(56) References Cited

U.S. PATENT DOCUMENTS

| | | |
|---|---|---|
| 6,505,249 B1 | 1/2003 | Rehkopf |
| 6,657,634 B1 | 12/2003 | Sinclair et al. |
| 6,661,423 B2 | 12/2003 | Lavelle et al. |
| 6,717,577 B1 | 4/2004 | Cheng et al. |
| 6,938,176 B1 | 8/2005 | Alben et al. |
| 7,058,953 B2 | 6/2006 | Willard et al. |
| 7,196,710 B1 | 3/2007 | Fouladi et al. |
| 7,197,669 B2 | 3/2007 | Kong et al. |
| 7,451,332 B2 | 11/2008 | Culbert et al. |
| 7,453,465 B2 | 11/2008 | Schmieder et al. |
| 7,487,371 B2 | 2/2009 | Simeral et al. |
| 7,545,373 B2 | 6/2009 | Knighton |
| 7,548,238 B2 | 6/2009 | Berteig et al. |
| 7,555,549 B1 | 6/2009 | Campbell |
| 7,665,019 B2 | 2/2010 | Jaeger |
| 7,778,800 B2 | 8/2010 | Aguaviva et al. |
| 7,782,325 B2 | 8/2010 | Gonzalez et al. |
| 7,950,003 B1 | 5/2011 | Duca et al. |
| 8,284,207 B2 | 10/2012 | Bakalash et al. |
| 8,286,143 B2 | 10/2012 | Garimella et al. |
| 8,448,067 B2 | 5/2013 | Cerny et al. |
| 8,462,166 B2 | 6/2013 | Sowerby et al. |
| 8,527,239 B2 | 9/2013 | Sowerby et al. |
| 8,581,916 B2 | 11/2013 | Cormack |
| 8,607,151 B2 | 12/2013 | Aguaviva et al. |
| 8,614,716 B2 | 12/2013 | Roy et al. |
| 8,676,530 B2 | 3/2014 | Roth et al. |
| 8,682,053 B2 | 3/2014 | Schneider |
| 8,933,948 B2 | 1/2015 | Sowerby et al. |
| 9,117,286 B2 | 8/2015 | Roy et al. |
| 2001/0011370 A1* | 8/2001 | Gunter ............... G06F 11/3664 717/128 |
| 2002/0140710 A1 | 10/2002 | Fliflet |
| 2006/0047649 A1 | 3/2006 | Liang |
| 2007/0139421 A1 | 6/2007 | Chen et al. |
| 2007/0240102 A1 | 10/2007 | Bello et al. |
| 2008/0033696 A1 | 2/2008 | Aguaviva |
| 2008/0034311 A1 | 2/2008 | Aguaviva et al. |
| 2008/0049009 A1 | 2/2008 | Khodorkovsky |
| 2008/0141131 A1 | 6/2008 | Cerny et al. |
| 2008/0195948 A1 | 8/2008 | Bauer |
| 2009/0027407 A1 | 1/2009 | Bourd et al. |
| 2009/0109230 A1 | 4/2009 | Miller et al. |
| 2009/0309885 A1 | 12/2009 | Samson et al. |
| 2010/0005341 A1* | 1/2010 | Agarwal ............. G06F 11/3692 714/38.11 |
| 2010/0020069 A1 | 1/2010 | Elmieh et al. |
| 2010/0131252 A1 | 5/2010 | Harris |
| 2011/0063296 A1 | 3/2011 | Bolz et al. |
| 2012/0081376 A1 | 4/2012 | Sowerby et al. |
| 2012/0081378 A1 | 4/2012 | Roy et al. |
| 2012/0102466 A1* | 4/2012 | Bates ................. G06F 11/3624 717/125 |
| 2012/0143588 A1 | 6/2012 | Liu et al. |
| 2014/0184624 A1 | 7/2014 | Roy et al. |

OTHER PUBLICATIONS

"GPU PerfStudio 2.3", AMD Developer Central, Frame Debugger, Launched Sep. 27, 2010, http://developer.amd.com/gpu/PerfStudio/pages/APITraceWindow.aspx, Sep. 27, 2010, 11 pages.

"NVIDIA—PerfHUD 6 User Guide", DU-01231-001_v09, Nov. 2004-2008, NVIDIA Corporation, 2701 San Tomas Expressway, Santa Clara, CA 95050, http://developer.download.nvidia.com/tools/NVPerfKit/6.5/PerfHUD6-UserGuide.pdf, 37 pages.

"NVIDIA—ShaderPerf 2.0 Quick Tutorial", DU-01231-001_v01, May 2004-2008, NVIDIA Corporation, 2701 San Tomas Expressway, Santa Clara, CA 95050, www.nvidia.com, 10 pages.

"Pix User's Guide", MSDN, 2006, http://msdn.microsoft.com/en-us/library/ee417207%28v=VS.85%29.aspx, 54 pages.

Lin, Keng-Yu, "GPTT: A Cross-Platform Graphics Performance Tuning Tool for Embedded System", National Sun Yat-sen University, 2006, 61 pages.

* cited by examiner

FIG. 3A

```
#import <test.h>

@interface PerfTestB : TestCase
@end
@implementation PerfTestB

- (void)testIncrementPerformance {
    // measure time to increment 10,000,000 NSNumbers
    [self
measureMetrics:@[XCTPerformanceMetric_WallClockTime]
automaticallyStartMeasuring:NO forBlock:^{
        // set up the test scenario
        NSMutableArray *bigList = [NSMutableArray array];
        for (long i=0; i<10000000; i++) {
            [bigList addObject:@(i)];
        }
        [self startMeasuring];
        // Increment and replace
        for (long i=0; i<10000000; i++) {
            NSNumber *number = bigList[i];
            bigList[i] = @(number.longValue + 1);
        }
        [self stopMeasuring];
    }];
}
- (void)testSortPerformance {
    // measure code performance
    [self measureBlock:^{          Time: 0.002 sec (24% STDEV)
                                   Baseline Avg: 0.0015
        [bigList sortWithOptions:NSSortStable
usingComparator:^NSComparisonResult(id obj1, id obj2) {
            return [obj1 compare:obj2 options:NSLiteralSearch];
        }];
    }];
}
@end
```

Toolbar Objects

PROJECTS

PerformanceTest A

PerformanceTest B

FunctionalTest

Supporting Files

FIG. 3B

| Toolbar Ojects | #import <test.h> | PERFORMANCE RESULT |
| | @interface PerfTestB : TestCase | Result: 99.049% Better (±24%) |
| PROJECTS | @end | Average: 0.01s |
| | @implementation PerfTestB | Baseline: 1.00s |
| PerformanceTest A | | Max STDEV: 30.00% |
| | | [EDIT] |
| PerformanceTest B | | |
| | - (void)testIncrementPerformance { | Value: 0.009(-1.28%) |
| FunctionalTest | // measure time to increment 10,000,000 NSNumbers | |
| | [self measureMetrics:@[XCTPerformanceMetric_WallClockTime] | |
| Supporting Files | automaticallyStartMeasuring:NO forBlock:^{ | |

```
// set up the test scenario
NSMutableArray *bigList = [NSMutableArray array];
for (long i=0; i<10000000; i++) {
    [bigList addObject:@(i)];
}
[self startMeasuring];
// Increment and replace
for (long i=0; i<10000000; i++) {
    NSNumber *number = bigList[i];
    bigList[i] = @(number.longValue + 1);
}
[self stopMeasuring];
}];
}
- (void)testSortPerformance {
// measure code performance
[self measureBlock:^{                           Time: 0.002 sec (24% STDEV)
                                                Baseline Avg: 0.001S
    [bigList sortWithOptions:NSSortStable
usingComparator:^NSComparisonResult(id obj1, id obj2) {
        return [obj1 compare:obj2 options:NSLiteralSearch];
    }];
}];
}
@end
```

FIG. 3C

PROJECTS

PerformanceTest A

PerformanceTest B

FunctionalTest

Supporting Files

Status: Ready

```
#import <test.h>
@interface PerfTestB : TestCase
@end
@implementation PerfTestB

- (void)testIncrementPerformance {
    // measure time to increment 10,000,000 NSNumbers
    [self measureMetrics:@[XCTPerformanceMetric_WallClockTime]
    automaticallyStartMeasuring:NO forBlock:^{
        // set up the test scenario
        NSMutableArray *bigList = [NSMutableArray array];
        for (long i=0; i<10000000; i++) {
            [bigList addObject:@(i)];
        }
        [self startMeasuring];
        // Increment and replace
        for (long i=0; i<10000000; i++) {
            NSNumber *number = bigList[i];
            bigList[i] = @(number.longValue + 1);
        }
        [self stopMeasuring];
    }];
}
- (void)testSortPerformance {
    // measure code performance
    [self measureBlock:^{
        [bigList sortWithOptions:NSSortStable
        usingComparator:^NSComparisonResult(id obj1, id obj2) {
            return [obj1 compare:obj2 options:NSLiteralSearch];
        }];
    }];
}
@end
```

FIG. 5

```
1  <!DOCTYPE plist PUBLIC>
2  <plist version "1.0">
3  <dict>
4     <key>ClassNames</key>
5     <dict>
6        <key>BotProjectTests</key>
7        <dict>
8           <key>Test</key>
9           <dict>
10             <key>baselineAvg</key>
11             <real>0.0976</real>
12             <key>baselineIntegrationDisplay</key>
13             <string>Integration 5</string>
14             <key>maxPercentStdDeviation</key>
15             <real>10</real>
16          </dict>
17       </dict>
18       <key>Test</key>
19       <dict>
20          <key>PerformanceMetric_ClockTime</key>
21          <dict>
22             <key>baselineAvg</key>
23             <real>3.139</real>
24             <key>baselineIntegrationDisplay</key>
25             <string>BotProject-Integration 3</string>
26             <key>maxPercentStdDeviation</key>
27             <real>10</real>
28          </dict>
29       </dict>
30       <key>performanceMetricIdentifiers</key>
31       <dict/>
32  </dict>
33  </plist>
```

502 (left panel) — Local Revision

```
1  <!DOCTYPE plist PUBLIC>
2  <plist version "1.0">
3  <dict>
4     <key>ClassNames</key>
5     <dict>
6        <key>BotProjectTests</key>
7        <dict>
8           <key>Test</key>
9           <dict>
10             <key>baselineAvg</key>
11             <real>0.5</real>
12             <key>baselineIntegrationDisplay</key>
13             <string>Integration 3</string>
14             <key>maxPercentStdDeviation</key>
15             <real>10</real>
16          </dict>
17       </dict>
18       <key>Test</key>
19       <dict>
20          <key>PerformanceMetric_ClockTime</key>
21          <dict>
22             <key>baselineAvg</key>
23             <real>3.139</real>
24             <key>baselineIntegrationDisplay</key>
25             <string>BotProject-Integration 3</string>
26             <key>maxPercentStdDeviation</key>
27             <real>10</real>
28          </dict>
29       </dict>
30       <key>performanceMetricIdentifiers</key>
31       <dict/>
32  </dict>
33  </plist>
```

504 (right panel) — 5/27/14 John Doe (BASE, HEAD)

510A, 510B

506 Local Revision
508 5/27/14 John Doe (BASE, HEAD)

Enter commit message here    512 Cancel    514 Commit 1 File

FIG. 6C

| | PROJECT TESTS | DATE | STATUS | TIME |
|---|---|---|---|---|
| Toolbar Ojects | | | | |
| ITEMS | - PROJECT 1 | | | |
| PerformanceTest A | - PROJECT 2 | | | |
| PerformanceTest B | -Test A | 1/14 | Pass | 0.13s |
| FunctionalTest | -Test B | 2/14 | Pass | +7.33% |
| Supporting Files | -Test C | 3/14 | Pass | 0.018s |
| | - PROJECT 3 | | | |
| + - | | | | |

FIG. 6D

| PROJECT TESTS | DATE | STATUS | TIME |
|---|---|---|---|
| - PROJECT 1 | | | |
| - PROJECT 2 | | | |
| -Test A | 1/14 | Pass | 0.13s |
| -Test B | 2/14 | Pass | +7.33% |
| -Test C | 3/14 | Pass | 0.018s |
| ° Device 1 | | Pass | +55.75% |
| °Device 2 | | Pass | -37.83% |
| - PROJECT 3 | | | |

Toolbar Ojects

ITEMS

PerformanceTest A

PerformanceTest B

FunctionalTest

Supporting Files

+ —

PERFORMANCE TESTING FOR BLOCKS OF CODE

CROSS-REFERENCE TO RELATED APPLICATIONS

This application claims priority to U.S. Provisional Patent Application No. 62/005,973, filed on May 30, 2014, entitled "PERFORMANCE TESTING FOR BLOCKS OF CODE," the content of which is incorporated herein by reference in its entirety.

TECHNICAL FIELD

The present technology pertains to performance testing, and more specifically pertains to testing performance of blocks of code in an application.

BACKGROUND

Software capabilities have been integrated with remarkable regularity in a score of common, everyday user devices such as mobile phones and tablet computers. Not surprisingly, the increasing software capabilities of these devices have prompted an enormous demand for software applications. This growing demand for software applications has further sparked increased competition between developers. Consequently, developers often work tirelessly to create or further develop applications in order to meet current user demands.

When creating software applications, developers often focus on the functional capabilities of their product. However, functionality often comes at a price: functional capabilities can have a negative impact on the overall performance of a software application. Yet users generally have high performance expectations in addition to their specific functional requirements. Accordingly, developers typically struggle to increase the functionality of their products, while trying to avoid sacrificing overall performance.

Unfortunately, developers currently lack tools to accurately and efficiently monitor the performance of applications throughout their development cycle, which would otherwise allow developers to identify and rectify performance regressions at any stage. As a result, developers often identify performance regressions long after integrating the offending portions of code. This leaves developers with the onerous task of working backwards to track performance regressions. This can be difficult and extremely costly, particularly in larger software projects, where it can be nearly impossible to track the point or cause of a performance regression. This can lead to unnecessary performance regressions in software products, which developers often accept to avoid the cost and difficulty of searching for the point or cause of such regressions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to generate a software testing tool that allows developers to efficiently and accurately perform performance tests on blocks of code in an application, and obtain meaningful results tailored to the tested application. As previously mentioned, performance tests, when performed for an entire application, can be extremely resource and cost intensive. Accordingly, by allowing the developer to limit the performance test to specific portions of code, the software testing tool can quickly perform the desired test and generate results without a great and unnecessary expenditure of time and resources. Given the limited cost and use of resources required by these tests, the developer can perform many tests for any particular portion of code throughout the development life cycle of the application, in order to obtain performance regression statistics, which can help the developer understand the progress of his or her application and correct any problems that emerge in the process.

When performing a test, the software testing tool can determine a baseline result that is specific to the application tested, to allow the developer to obtain a meaningful interpretation of the results. The baseline can be specific to the application and system being tested, and the baseline can be stored in a way that describes the hardware and software associated with the baseline. A specific software test can have multiple baselines, but when the software testing tool performs the test, it can use the baseline that is specific to the relevant hardware and software combination. Moreover, the baseline result can be obtained in various ways to account for varying degrees of acceptable sensitivity or accuracy. Moreover, the baseline results can be used to determine whether the current state of the tested code comports with the developer's expectations, and whether the tested code has regressed at any point during the development stages.

Advantageously, the software testing tool can also provide an interface for the developer to view and analyze testing results for one or more portions of code and obtain testing information, such as baseline test results and standard deviations, which the developer can use to interpret test results. The interface can present various types of useful information and visual illustrations, such as a chart or window illustrating any progress or regressions vis-à-vis the baseline, throughout a time period or testing history. Thus, developers can conveniently obtain metrics and statistics for specific portions of code in their application in order to gain useful insights into the performance of those portions of code throughout the development cycle of the application.

Disclosed are systems, methods, and computer-readable storage media for testing performance of blocks of code. A system can receive a request to run a performance test for a selected portion of code in an application, obtain a baseline performance test result corresponding to the performance test for the selected portion of code in the application, and run the performance test for the selected portion of code in the application. The system can then generate a performance test result based on the performance test and the baseline performance test result. Moreover, the system can present the test result and/or the baseline performance test result via a graphical user interface.

The system can receive the request to run the performance test via the graphical user interface. In some configurations, the graphical user interface can include a window or an area where a user can drop, select, or browse for, a portion of code that he or she wants to test. Moreover, the graphical user interface can serve as an interface for a software testing tool that serves as the testing engine. The graphical user interface can receive specific settings or commands from the user to control the testing tool, modify parameters, and/or define output results. For example, the user can define specific parameters or testing metrics, such as speed or memory usage, for the performance test through the graphical user interface. As another example, the user can specify what information should be presented in the output, such as the test results, the baseline test results, previous test results, a comparison of the test results and the baseline test results, a performance message or alert, a standard deviation, pass or fail results, errors, etc.

The user can also configure the format or view of the output presented in the graphical user interface. For example, the user can set the graphical user interface to present one or more test results in a graph, table, or any representation charting the results over a period of time. Moreover, the user can set the period of time that should be captured in the output. For example, the user can specify that the output should include test results and/or any other information for a specific period of time, such as a day, a week, a month, or a year.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 3A-C illustrate example configurations of a user interface for a performance testing tool;

FIG. 5 illustrates an example display of preference lists for performance tests;

FIGS. 6A-D illustrate examples of various presentations of performance tests;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for convenient and efficient performance testing of blocks of code in an application. Disclosed are systems, methods, and non-transitory computer-readable storage media for testing performance of blocks of code. A brief introductory description of an exemplary system is disclosed herein. A detailed description of performance testing tools and graphical user interfaces, as well as exemplary variations, will then follow. These variations shall be described herein as the various embodiments are set forth. The disclosure now turns to FIG. 1.

Figure 1:
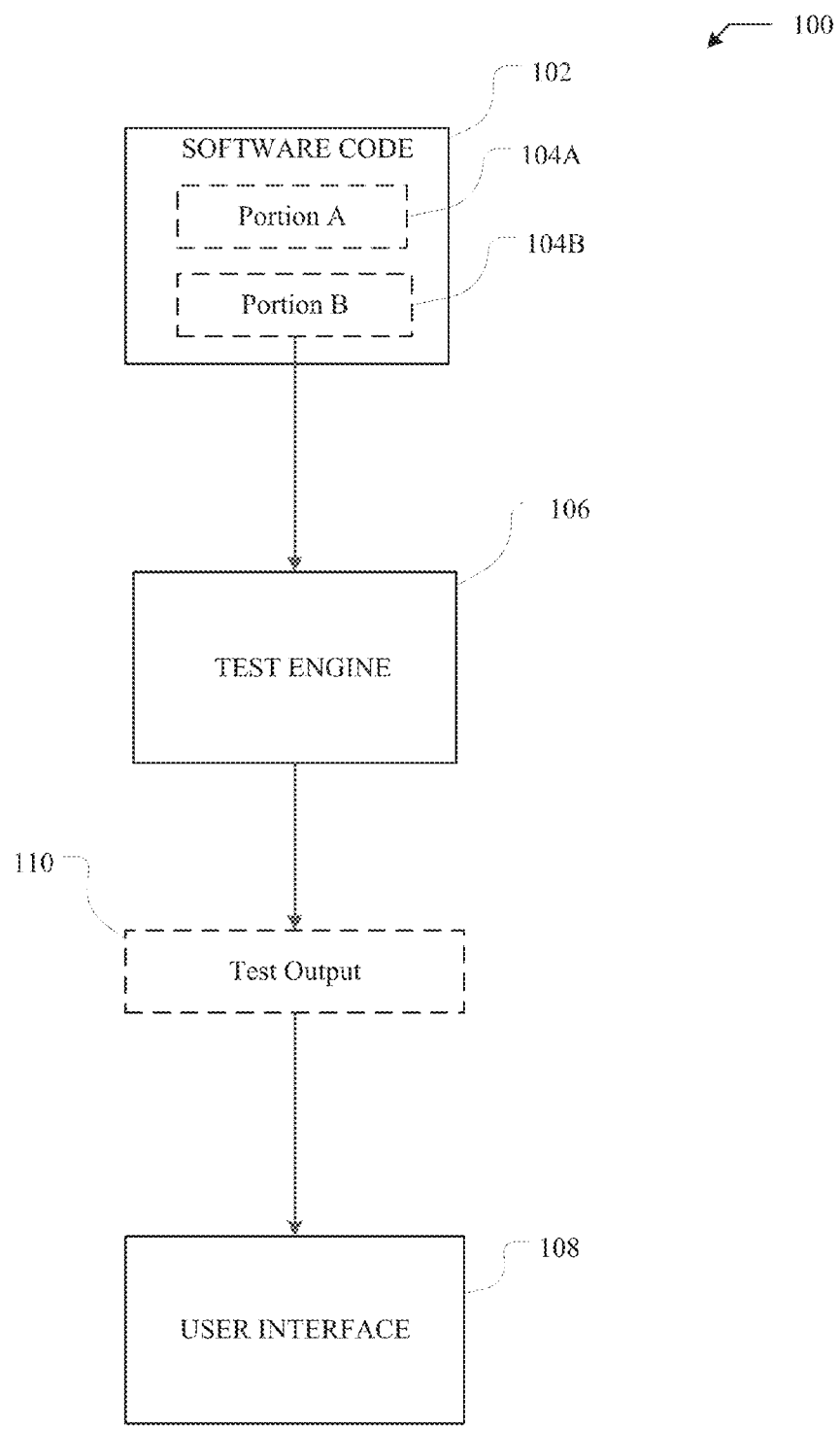
FIG. 1 illustrates an example system for running performance tests for blocks of code.

FIG. 1 illustrates an example system 100 for running performance tests for blocks of code according to some aspects of this invention. The software code 102 can include code blocks 104A-B as part of the application. A developer can select any of the blocks 104A-B for testing separately or together. Testing individual blocks can minimize the testing time and cost, and can help a developer focus on the performance of a specific portion of code, as opposed to the whole application. By testing individual blocks 104A-B over time, the developer can also gain insight into the performance of the individual blocks 104A-B throughout the development cycle of the application, allowing the developer to make any necessary adjustments to improve the performance of the tested blocks, as well as the application as a whole.

The individual blocks 104A-B can include any portion of the code 102 selected by the developer for testing. For example, a selected block can include one or more functions, one or more blocks, one or more sub-blocks, an execution path, a module, a routine, a method, a procedure, a program, a sequence of code, etc. The individual blocks 104A-B can be selected or adjusted by the developer prior to, or after, testing.

As previously mentioned, the developer can select any of the blocks 104A-B for testing. For example, the developer can select block 104B for testing, by dragging the block into an input portion in the user interface 108, coding the block 104B into an area of the user interface 108, browsing for the block 104B using a browse function on the user interface 108, or otherwise defining a path to the block 104B. If the developer selects block 104B, the test engine 106 then runs a performance test on the selected block 104B.

The test engine 106 can run the performance test based on one or more parameters or metrics, such as speed, memory usage, resource allocation or usage, etc. In some cases, the user can specify the parameters or metrics for the performance test through the user interface 108. For example, the user can select an element on the user interface 108 to specify that the performance test should test for memory usage, or otherwise select or define the type of test right from the user interface 108.

After running the performance test, the test engine generates a test output 110 and passes the test output 110 to the user interface 108 for presentation at the user interface 108. The test output 110 can include a test result based on the specific parameter(s) or metric(s) used by the test engine 106 to run the performance test. For example, the test output 110 can include a speed in seconds, minutes, or hours that it took the test engine 106 to execute the selected block of code 104B. If previous tests for block 104B have been performed by the test engine 106 in the past, the test output 110 can also include one or more of the previous test results and/or an average of the previous test results. Moreover, the test output 110 can also include a difference between the current test result and the average of the previous test results, as well as a standard deviation of the previous test results. The standard deviation can be calculated based on the square root of the variance calculated from the previous test results.

The user interface 108 can receive the test output 110 and present one or more portions or values from the test output 110 through the interface. For example, the user interface 108 can present the test results for the current test, the average result from previous test results, the difference between the current test result and the average test results, the standard deviation calculated from the previous test results, a maximum or minimum standard deviation configured for the performance tests, and/or a pass or fail notification alert. In some cases, the user interface 108 can present the previous test results in a graph or chart to illustrate the changes over time. The developer here can also define the period of time that should be considered when presenting previous results. For example, the developer can set, through the user interface 108, a period of a day or a week which would prompt the user interface 108 to present any results within that specified period.

The user interface 108 can also present an option to the user allowing the user to select a particular test result as the baseline test result to use in comparing or interpreting future tests results. For example, if the user believes a current test result is representative of what is expected from the performance tests, the user can set the current test result as the baseline test result through the user interface 108. Once the baseline result is set, any future test results can be reported by the user interface 108 with respect to the baseline result. For example, a future test can be reported using the test results from that test and a comparison between that test and the previously-selected baseline test. This can help the user interpret the results of tests and measure the changes in performance of the selected block of code 104B over time.

In some embodiments, the baseline result can be generated by the test engine 106 automatically. For example, the test engine 106 can use the selected block 104B to perform a number of baseline tests in order to obtain multiple results which it can use to automatically calculate a baseline result. The baseline tests can include multiple tests executed based on the specific, requested parameters or metrics. For example, the baseline tests can include ten performance tests executed to obtain ten separate test results. The baseline result can then be calculated based on the results from the baseline tests by determining the average or mean of the aggregate test results, for example.

The baseline result can also be automatically generated by the test engine 108 in other ways. For example, the baseline result can be calculated based on the median of the test results from a number of baseline tests executed by the test engine 106. In other cases, the baseline result can be calculated based on an average of a subset of test results from the baseline tests executed by the test engine 108. For example, the highest and lowest test results can be removed from the equation and the average then calculated based on the remaining results. As another example, if there is one or more values that are significantly different than the bulk of the results, the test engine 106 can ignore those one or more values or anomalies when calculating the baseline result.

In some cases, if the test engine 106 cannot extract a reasonable average from the baseline tests, it can report an error message indicating that a meaningful baseline result was not obtained. For example, if the range of results from the baseline tests is extremely large or small, for example within a range threshold, the test engine 106 can report an error suggesting that the tests did not follow a meaningful or expected pattern/behavior. In some cases, if the results vary widely, the test engine 106 can interpret the results as an error as no reasonable average can be obtained from the widely varying results. This can allow the developer to review the tested block of code for any problems that may cause such discrepancies. The developer can also instruct the test engine 106 through the user interface 108 to increase the number of baseline tests executed to determine if a reasonable or meaningful average, such as an average based on results having less than a threshold amount or number of discrepancies, can be obtained. This can allow the test engine 106 to calculate the baseline result based on a greater number of values which may allow for specific patterns to emerge.

The developer can also adjust the tolerance for reporting an error when calculating the baseline result. For example, if the developer expects unusual variations in results or a greater range of results, or if the developer is not so concerned with a certain level of discrepancies, he or she can set the tolerance higher to avoid an error result, unless the result(s) exceed the tolerance. On the other hand, if the developer expects greater consistence and little variation in results, he or she can set the tolerance to low (or lower) to trigger an error within a lower threshold. For example, if a tested block of code is an important component of the code 102 as a whole, the developer may want better performance and consistency for that particular block of code. Here, the developer can lower the tolerance to ensure that errors are reported with more sensitivity.

Referring back to the standard deviation, this value can be calculated based on the results from the tests previously performed by the test engine 106. For example, the variance of the results can be obtained based on the average of the squared differences from the mean. The standard deviation can then be calculated based on the square root of the variance.

The standard deviation can serve as an error margin for the test result vis-à-vis the baseline or average results. In other words, the standard deviation can provide the developer with a comparison of the test result with respect to the results from the previous tests. Thus, the standard deviation can provide the developer insight into the performance of the test result in comparison to the previous test results and the performance of the test results over time.

The user can set a maximum standard deviation that is acceptable for any particular test through the user interface 108. The maximum standard deviation can then be used in the test output 110 to generate a pass or fail alert. For example, the test engine 106 can generate a fail notification if the test result exceeds the maximum standard deviation based on the average or baseline results. On the other hand, the test engine 106 can generate a pass result if the test result is within the maximum standard deviation.

The developer can also configure a pass/fail tolerance for the test engine 106, through the graphical user interface 108. For example, the developer can input one or more values through the graphical user interface 108 which specify the acceptable range of results that should yield a pass result, or the range(s) of results that should trigger a fail. The tolerance set by the developer can depend on one or more factors, such as the device running the performance test, the results of previous performance tests, the degree of consistency desired or previously observed, the standard deviation 116, etc. For example, if the standard deviation is very small or if the range of results from the previous tests are very small, the developer may expect a very small degree of variation in the test result and thus set the tolerance to very small or sensitive.

The user interface 108 can present the test output 110 and any other information within one or more windows, views, or areas in the user interface 108. In some cases, the user interface 108 can present the code 102, including one or more of the blocks 104A-B, and the test output 110 linked or associated with the tested code. For example, the user interface 108 can present a tag, comment, window, or notation next to the tested block of code presenting the test output 110. In some embodiments, the user interface 108 can also present one or more portions of the test output 110 through a separate window or area, such as a pop-up window. For example, the user interface 108 can present the code 102 and/or the selected block 104B and generate a pop-up window with one or more portions of the test output 110, such as the test results, previous test results, the average test result, the standard deviation, the maximum standard deviation, the parameters or metrics, any graphs or charts, and so forth. The pop-up window can also include buttons or objects that allow the user to provide input, such as selecting a value or result, modifying a parameter, setting a baseline, replaying a test, recalculating a value, modifying a display or graphic, etc.

Figure 2:
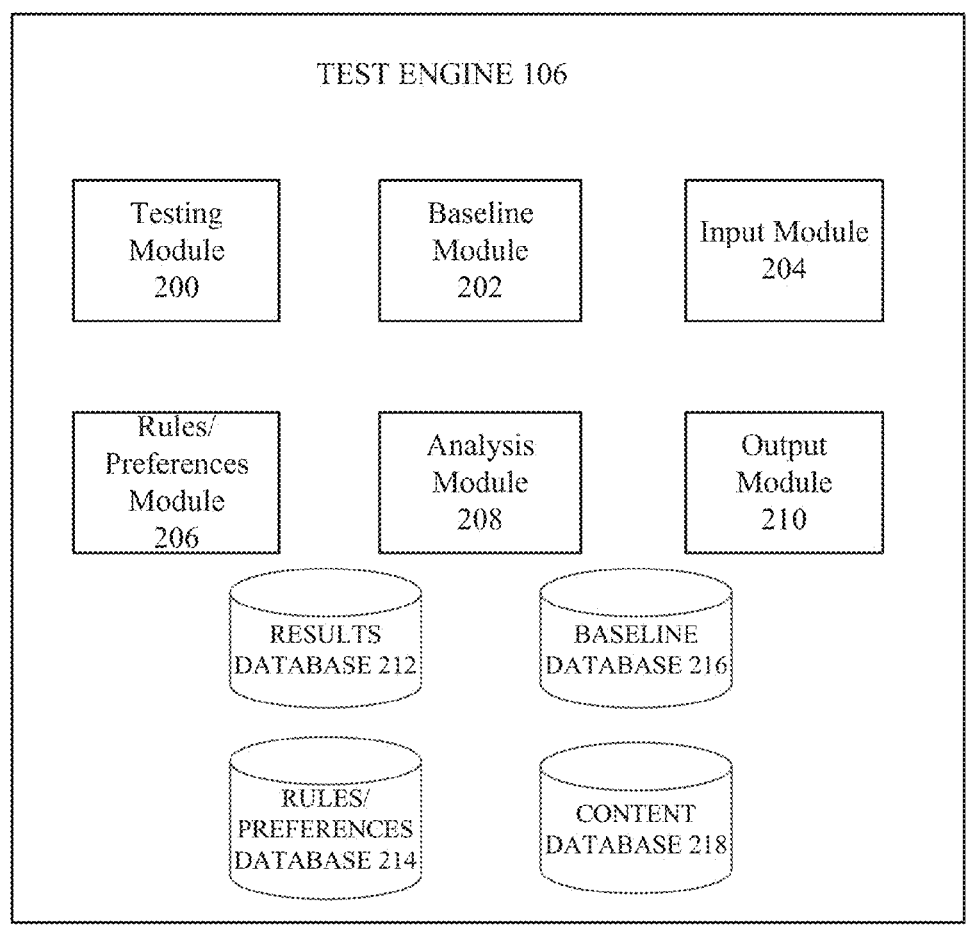
FIG. 2 illustrates an example software testing tool.

FIG. 2 illustrates an example test engine 106 for executing performance tests of blocks of code. The test engine 106 can be a software tool on any computing device, such as a laptop, a tablet computer, a server, a mobile device, a smartphone, a virtual machine, etc. The test engine 106 can include a testing module 200 for performing performance tests on one or more blocks of code. The testing module 200 can also perform other types of tests, such as functional tests, for example. Moreover, the testing module 200 can perform tests based on one or more parameters or metrics. For example, the testing module 200 can perform tests based on speed, memory usage, resource allocation, file usage, processor usage, service usage, etc.

The baseline module 202 can perform baseline tests to automatically generate a baseline result for a test on a block of code. For example, the baseline module 202 can perform multiple tests, such as 10 or 20 tests, on a block of code and obtain multiple results for the various tests. The baseline module 202 can then calculate an average result of the various test results and mark the average result as the baseline result. The baseline result can then be used by the test engine 106 when reporting the test results from the performance test. For example, the analysis module 208 can analyze the test results and the baseline results and determine whether the test should be reported as a pass or a fail. The analysis module 208 can also use the baseline tests or results to obtain a standard deviation, which it can analyze and compare to test results to instruct the test engine how the test results should be reported to the user with respect to the standard deviation or prior performance conditions.

The input module 204 can receive user inputs for controlling the tests, baseline calculations, outputs, etc. For example, the input module 204 can receive specific parameters for the performance test, such as memory test parameters, and communicate that information to the proper module(s) as necessary. As another example, the input module 204 can receive input from a user specifying a specific period of time to consider in calculating prior results or reporting averages. Further, the input module 204 can allow a user to edit calculated or generated results and set a specific value or result as a baseline. For example, if the test engine 106 performs 10 performance tests for a particular block of code and the user believes the test results from test number 6 are representative of the baseline (i.e., what should be expected from the test), the user can set the results from test number 6 as the baseline result through input module 204.

The rules and preferences module 206 can maintain and retrieve rules and preferences for performing the tests. For example, the rules and preferences module 206 can maintain a schedule of tests to automatically perform tests for a block of code every specific interval of time. The rules and preferences module 206 can also include instructions for calculating standard deviations, averages, pass or fail results, etc.

The output module 210 can be configured to generate results from the tests and output the information to the user interface 108 according to user preferences or application policies and settings. The output module 210 can also communicate with a remote device or database to report any of the results obtain by the test engine 106.

The test engine 106 can maintain test results in the results database 212. This way, the results of tests for a block of code can be available throughout a development cycle of the application. The storage timing can be configured by the user through the rules and preferences module 206, for example. Thus, the results database 212 can maintain indefinite results, but can also limit the results it maintains to a period of time specified by the user, a policy, device capabilities, etc. In some cases, results can be aged and later replaced by newer results as they are obtained. In other cases, however, the results generated can be maintained throughout all the development stages so the user can access the results and determine any regressions or improvements made for a block throughout the development of the application.

The baseline database 216 can store and maintain baseline results for blocks of code, as well as aggregate results of tests used in calculating the baseline results. For example, if a baseline result is calculated based on 10 performance tests of a block of code, the baseline database 216 can store and maintain the results for all 10 performance tests as well as the baseline result obtained based on those results. In addition, the baseline database 216 can update baseline information as new information is generated or calculated. The new baseline information can overwrite, supplement, or replace previous baseline information, but can also be treated or stored separately to maintain a record of both.

The rules and preferences database 214 can store and maintain any of the rules and preferences used by the test engine 106. As rules or preferences are added or updated, the rules and preferences database 214 can store or update such rules and preferences. For example, the rules and preferences module 206 can communicate with the rules and preferences database 214 to retrieve, store, update, or modify preferences as necessary.

The content database 218 can store and maintain objects, tools, code, functions, elements, files, folders, projects, media items, software, instructions, logs, etc. For example, the content database 218 can store blocks of code to be tested, application project files, media items, software objects, plists, XML files, libraries, etc. The content items in the content database 218 can be used by the test engine 106 and running the tests, accessing the appropriate content files, presenting the portions of content that are relevant, and so forth.

FIGS. 3A, 3B, and 3C illustrate example configurations of a user interface 108 for a performance testing tool. The user interface 108 can include a projects listing 302 which can list the various projects, files, and/or libraries available for tests. A project can include code 102, which can include one or more blocks 104A-B for testing, as previously described in FIG. 1. The developer can access the user interface 108 and select a code block 104B for testing. Here, the developer can highlight or select the relevant portion of code 104B, drag and drop the code 104B to be tested, enter the code 104B in the user interface 108, browse for a file with the code 104B through a toolbar object from the toolbar 304, enter a path, or select the code 104B through any other method.

In some cases, the user interface 108 can then highlight or mark the selected portion of code 104B to indicate which block is being, or has been, tested. The test engine 106 can perform the performance test on the selected block 104B, and communicate test results 300 to the user interface 108. The user interface 108 can then present the results 300 as part of the performance test. In some embodiments, the developer can select where to start and stop measuring code. For example, the developer can setup the test to indicate where to start and stop measuring. The portion that is measured can mutate the objects setup for testing. Moreover, in some cases, the developer can perform the setup work each time to indicate the start and stopping points for each test scenario.

The results 300 can include a value calculated based on the specific metric or parameter tested, such as speed or memory usage. For example, if the metric is speed, the results 300 can include the time of execution for the selected block 104B. The results 300 can also include a standard deviation of the test with respect to one or more previous tests, and/or a baseline average result. In some configurations, the results 300 can also include the results from one or more prior tests or a comparison between the current result and one or more prior test results. In other configurations, the results 300 can also include a notification, such as a pass or fail notification, which can be based on an average or baseline result and/or a standard deviation. Here, the results 300 can further specify a tolerance used to calculate the notification, such as a maximum standard deviation, for example.

The toolbar 304 can include objects and functions used to modify the contents, manage the testing process, enter preferences and rules, enter code or parameters, generate one or more displays, etc. For example, the toolbar 304 can include a menu item for entering preferences, and control features for starting, stopping, pausing, and replaying a test. As another example, the toolbar 304 can include objects for selecting code blocks, modifying the results and output, modifying the testing parameters, and so forth. In addition, the toolbar 304 can include menus for saving a test, result, or project; highlighting or tagging a portion of code or content; creating a new project; changing a view; etc.

Referring to FIG. 3B, the user interface 108 can also generate a results window 306 to display the testing results of a test and any other relevant information. The results window 306 can be a pop-up window or window or area within the user interface 108. The results window 306 can list the value or result of a test, such as a time in a speed test, an average value for previous tests, a baseline informing what the expected results should be, a standard deviation, a maximum or minimum standard deviation, a notification of pass or fail, a progress or regression trajectory, an improvement or regression from a previous test (or the baseline), and/or the performance results as a comparison with the average, baseline, and/or standard deviation.

The results window 306 can also provide previous results with respect to the current result and/or the baseline. In some embodiments, the results window 306 can include a graph representing the various test results generated over a period of time. Each value can be represented, for example, by a bar on the graph. This can provide a visual illustration of the performance trajectory of the block 104B of code over a period of time.

The results window 306 can also include an object, such as an edit button, which allows a user to edit one or more portions of the results window 306. In some configurations, the object can be used to modify the maximum standard deviation for the testing, which provides a defined tolerance to follow. This can be useful to the user as he or she tries to reach the optimal tolerance for a block of code.

Referring to FIG. 3C, the user interface 108 can display the code 308 of the selected project 102 for the user. In addition, the user interface 108 can display a status 310 of the code 308 and/or the performance test. The status 310 can indicate, for example, whether the code is ready or not to process, or whether the test is running, processing, stopped, completed, paused, interrupted, or has encountered an error. When ready, the toolbar objects 304 can include an object, such as a play or run object, which the user can press or select to initiate the test. The toolbar objects 304 can also include stop or pause features to stop or pause the test. In some cases, the toolbar objects 304 can also include additional test or code manipulation objects, such as edit buttons, zoom buttons, selection buttons, record buttons, save buttons, delete buttons, insert buttons, buttons for browsing files, file path fields, preview functions, etc.

In addition, the objects in the toolbar objects 304, in some cases, can depend on the status of the code and/or the test. For example, if the code is ready, the toolbar objects 304 can display a play or run object. On the other hand, if a test is running, the toolbar objects 304 can display a stop or pause object. In some embodiments, objects that are not pertinent to the current circumstances can be grayed out or not displayed at all. Here, once the circumstances change, the objects displayed can also change to remain relevant to the current circumstances. For example, once a running test is complete, the toolbar objects 304 can remove the stop object and display a run, play, or replay object.

In some cases, a user can make changes to the code 308 before or after running a test. For example, the interface 108 can display the code 308 associated with the project 102 selected by the user, and the user can either make changes to the code 308 right from the interface 108 prior to running a test, or otherwise run a test and subsequently make a change to the code 308 right from the interface 108. The user can then run another test based on the modified code and compare results to see if the modification improves or deteriorates the test results.

Figure 4A:
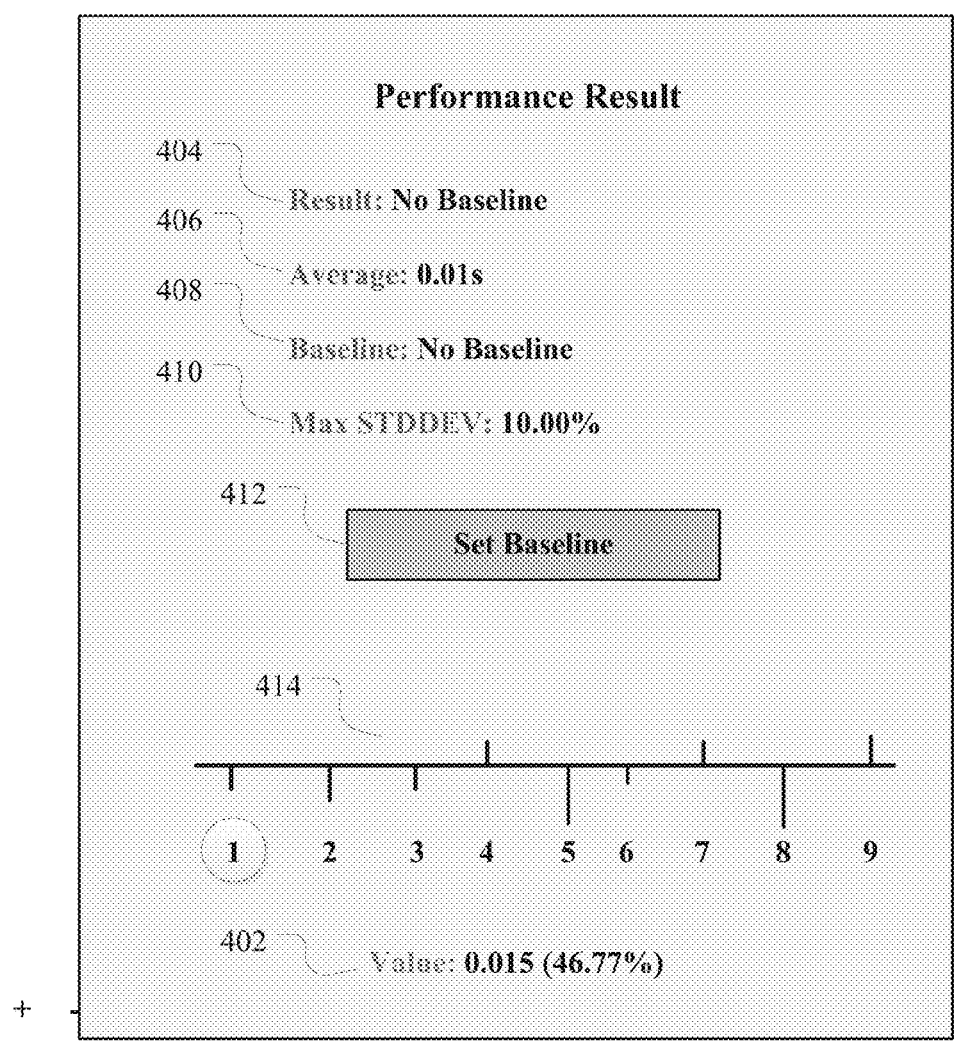
FIGS. 4A-C illustrate example results windows for performance tests.
Figure 4B:
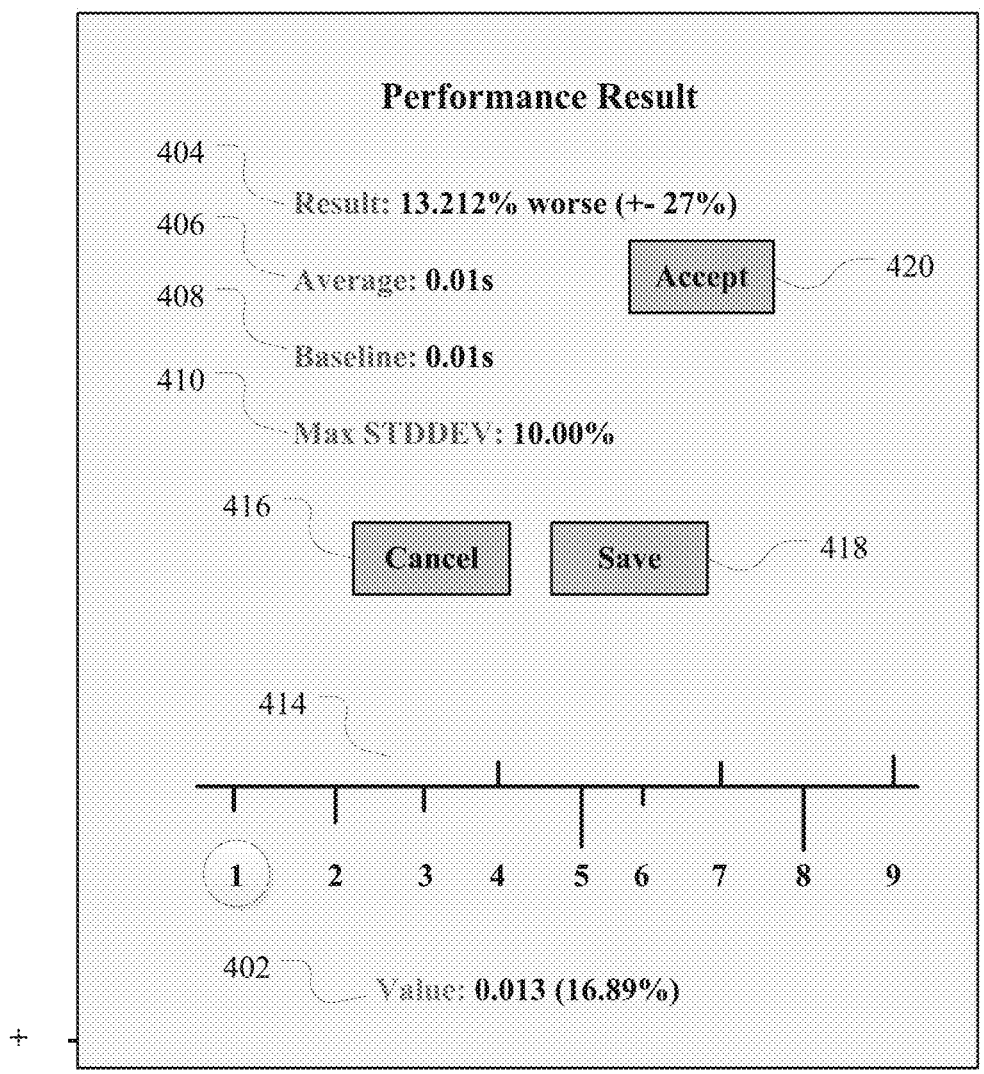
Figure 4C:
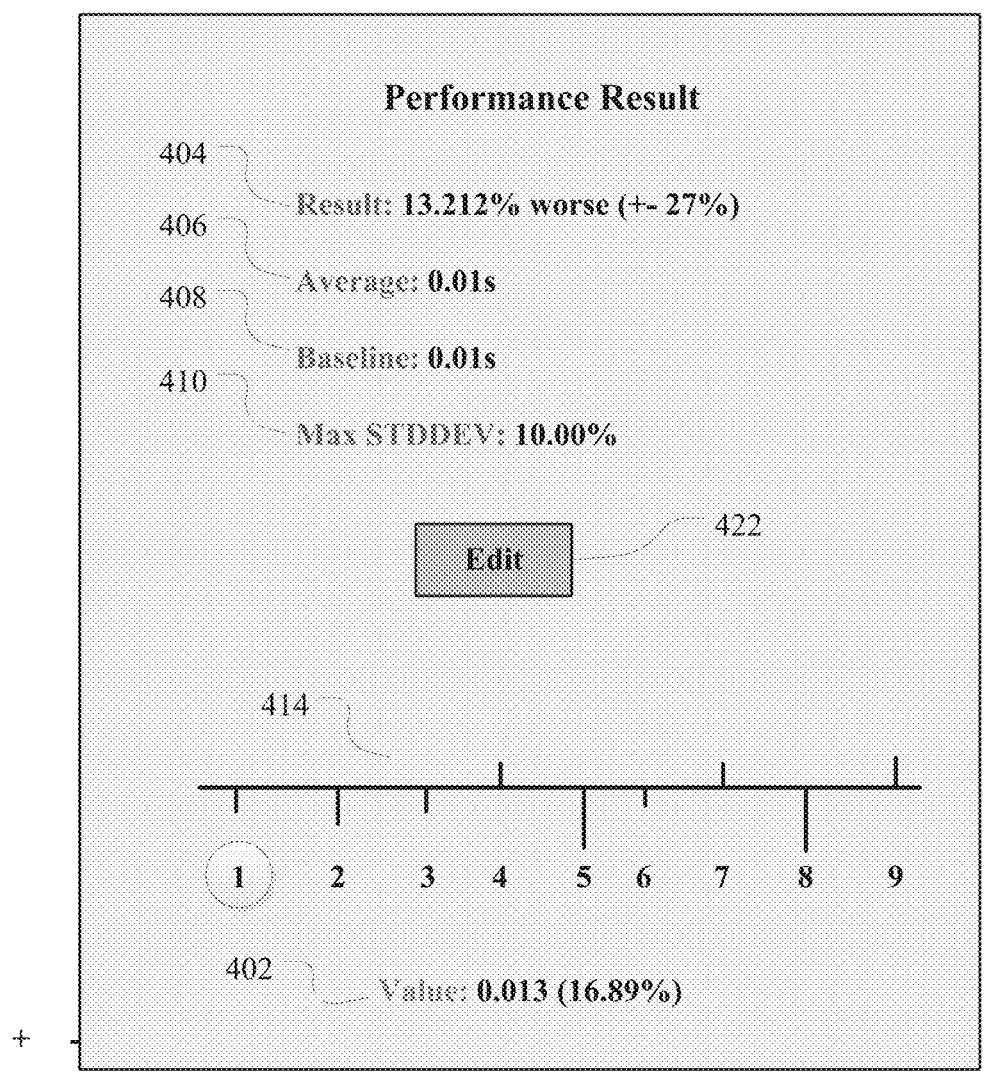

FIGS. 4A-4C illustrate examples of a results window 400 for a performance test. The results window 400 can display various results obtained from one or more performance tests, such as a current test result 402, a relative result 404 with respect to a baseline 408, an average of tests 406, a baseline 408, a maximum standard deviation 410 configured, an illustration of combined tests 414, etc.

The current test result 402 can provide an actual testing value, such as a running or completion time, an error, or any other metric. In some cases, the current test result 402 can also include additional information, such as a percentage or range comparing the result with prior test results. For example, if the value of the current test result 402 falls in the 46 percentile with respect to a defined number of previous test values (e.g., 5 previous values, 10 previous values, previous values in the last week, or all previous values), the current test result 402 can display 46% to indicate the 46 percentile. The defined number of values, in some cases, can be preset by the system or configured by the user.

The relative result 404 can provide an indication specifying whether the current test result 402 is better, the same, or worse than the baseline 408 or any other previous test result. The relative result 404 can also indicate a percentage or value indicating how much better or worse the current result is 402. If no baseline has been set, the relative result 404 may not show any value, as it does not have any values to compare the current test result 402 to.

The average test result 406 can indicate the average result computed for a defined number of previous test results. In other cases, the average can also show a median result, to give the user more information to process.

The baseline 408 can indicate the baseline computed for that particular test and portion of code. The baseline 408 can be computed based on one or more previous tests. For example, the baseline 408 can be computed by running 10 tests and computing the average of the 10 tests as the baseline. In other cases, a user (or the system) can select a specific test from the 10 tests to serve as the baseline. Indeed, the user can set the baseline 408 to the current test result 402 using the set baseline object 412. The set baseline object 412 can be a button, for example, that a user can select to set the current test result 402 as the baseline 408. In some cases, the set baseline object 412 is displayed after a test when no baseline has been previously set. However, in other cases, the set baseline object 412 can be displayed after every test, to give the user an opportunity after every test to set the resulting value as the baseline 408.

In still other cases, the set baseline object 412 can be displayed after specific tests identified by the system. For example, after running a test, the system can identify the test result as a good candidate and display the set baseline object 412 as a recommended option to set that specific test result as the baseline. A good candidate can be identified by the system, for example, if the test result is calculated to be representative of what is expected for that test and code. For example, if the system has performed previous tests, it can determine an average or median result, and allow a user to set a particular test result as the baseline when the test result falls within a threshold deviation from that average or median. As another example, the system can be configured with an expected value indicating a value or range expected for that particular test and/or code, and present the set baseline object 412 after a test that is within a threshold deviation from that expected value or range. If the system has no average, median, or expected value or range, it can use other metrics or calculations to determine if a test result is a good candidate for a baseline, and present the set baseline object 412 accordingly.

Moreover, the results window 400 can present the maximum standard deviation 410 set for that particular test and/or code. The user can then determine whether the current test result 402 falls within the maximum standard deviation by reviewing the results window 400. Also, if the result 404 shows a result, such as good, pass, or fail, based on a deviation from the baseline, the user can determine how sensitive such result is based on the maximum standard deviation 410. If the user desires the calculations to be based on a deviation that is more or less sensitive, the user can edit the maximum standard deviation 410 for future tests. To this end, in some cases, the results window 400 can include an edit button that allows a user to edit the configured maximum standard deviation, such as the edit button 422 shown in FIG. 4C.

As previously mentioned, the results window 400 can also present an illustration of combined tests 414. In some cases, the illustration 414 can be a graph depicting the various test results, and can include the number of tests in their proper sequence. The graph can show the performance of the various tests over time and/or over a number of tests. The illustration 414 can also mark a number indicating the number associated with the current test. For example, if the current test is the first test, the illustration can circle the number 1. If the current test is the sixth test, the illustration can circle or mark the number 6. In some embodiments, the illustration 414 can instead be a chart, a table, a plot, a list of test values, a sequence of percentages, etc.

The results window 306 can be a pop-up window or any window or area within the user interface 108. The results window 306 can also generate a notification of pass or fail, a progress or regression trajectory, an improvement or regression from a previous test (or the baseline), an alarm, etc. Moreover, the type of window (e.g., pop-up window versus window within user interface 108, tab, etc.), the format of the window or values within (e.g., the colors, fonts, symbols, language, etc.) can change based on the current results relative to the baseline. For example, if the test result is a fail, the fail notification can be presented in red or any other distinctive color or format to bring extra attention to the result. On the other hand, if the test is a pass, the result can be presented in green to connote a good result. As another example, if the current test requires various different parameters to be set because they have not been previously configured, then the results window 306 may be generated as a pop-up window to allow more space for providing objects and options to the user for setting various parameters.

As previously mentioned, the results window 400 can include different objects or options to allow a user to specify various configuration parameters. For example, referring to FIG. 4B, the results window 400 can include an accept object 420 where the user can select to accept an average result presented if they choose to do so. Moreover, the results window 400 can include a cancel object 416 and a save object 418 to allow a user to cancel the test results and calculation or save the information for the future. If the user selects the cancel object 416, the system can discard any test result from the current test and/or any calculation or result adjusted as a result of the current test result. On the other hand, if the user selects the save object 418, the system can store any of the results or parameters set and presented in the results window 400.

Referring to FIG. 4C, the results window 400 can also include an edit object 422, which can allow a user to edit any of the results or parameters displayed in the results window 400. For example, the user can select the edit object 422 to modify the baseline 408, the maximum standard deviation 410, the average 406, etc.

As one of ordinary skill in the art will readily recognize, the various objects referenced herein can refer to any functional object that allows a user to perform an action or selection, input information, or invoke a function. For example, an object can include a button, a link, a field, or any element capable of invoking a script, function, or any piece of software code.

FIG. 5 illustrates an example display 500 of preference lists 502 and 504 for performance tests. The preference lists 502 and 504 can include different preferences set for running tests, such as performance tests on blocks of code. The display 500 can present the various testing parameters and calculation values, such as those illustrated in FIGS. 4A-4C. This information can then be applied for testing.

In addition, the display 500 can identify differences in parameters or values within the preference lists 502 and 504. For example, the display 500 can highlight lines of code, such as lines 510A and 510B, to indicate different values associated with those lines. Thus, if the baseline average is different in preference list 502 than preference list 504, the display 500 can highlight the lines of code corresponding to those differences for the user. Accordingly, the user can view and compare the differences between values and parameters in lists 502 and 504 to gain better insight into the testing.

The number of preference lists that can be displayed together can vary. For example, display 500 illustrates two preference lists corresponding to different revisions. However, in other embodiments, the display 500 can illustrate 3, 4, 5, or any other number of preference lists for the user to compare. In some cases, the user can select the number of preference lists to be shown. The user can also select which preference lists should be displayed. In some cases, the preference lists presented can include a current revision and a baseline version. This way, the user can compare preference lists for a current test in view of a baseline test.

The display 500 can include labels 506 and 508 indicating which preference lists are being presented. For example, preference list 502 is illustrated as having the label 506 which indicates that this list is titled "Local Revision," and list 508 is illustrated as having label 508 which indicates that this list is titled "5/27/14 John Doe (BASE, HEAD)". This way, the user can look at the labels 506, 508 and quickly identify which blocks of code are being presented in the display 500.

In addition, the display 500 can include a cancel button 512 to cancel the use or storage of the preference lists 502 and 504 on a test. Moreover, the display 500 can include a commit file button 514, which can allow a user to commit one or more preference lists for testing. This way, the user can review preference lists, and corresponding values and parameters, to decide whether the preference lists should be used or maintained by the system for future testing and calculations.

FIGS. 6A-6D illustrate examples of various presentations of performance tests performed. The user interface 108 can display a list of items 602 which can be viewed by the user when selecting projects for testing and reviewing. The items 602 can include tests executed, tests configured for execution, tests suggested for a user, tests selected for execution, projects created or uploaded by a user, files associated with tests or projects, configuration files, etc.

The user can select an item, such as a test, from the items 602 to view that item and any information associated with it, such as testing information for a test project previously executed. For example, the user can select test 102, which includes specific portions of tested code and configured testing parameters, to view the corresponding tests and testing information. Once the test 102 is selected, the corresponding tests and testing information 608 for that test can be displayed in the display area 606 of the user interface 108.

The display area 606 can present testing information 608 about a selected item. The testing information 608 can include the name of a project or test associated with the selected item 102, and any results or parameters associated with the project or test. The results can be displayed as a value, indicating the metric obtained for that test, as well as any additional testing information and parameters. For example, the testing information 608 can display results presented as a percentage indicating the results of that particular test. As previously mentioned, the results can be based on a baseline result and/or an average of test results. The testing results can also indicate whether the test received a pass or fail. In some cases, a check mark can be displayed when the test result is a pass and an X can be displayed when it's a fail.

The display area 606 can illustrate all tests associated with the selected test 102. However, in some cases, the display area 606 can filter information to display only specific subsets of information. For example, the display area 606 can filter tests by pass or fail results, in order to limit the presentation of tests to only those tests that have passed or failed. In some embodiments, the user can select "All" in the display area 606 to view all tests for the selected test 102. Alternatively, the user can select "Passed" to view tests that have passed or "Failed" to view failed tests. This way, the user can quickly sort and view the category of tests that he or she is interested in viewing.

The user interface 108 can also include toolbar objects 604 to allow the user to make selections, perform actions, input data, etc. For example, the toolbar objects 604 can include objects or buttons for browsing files, playing or running tests, stopping or pausing tests, selecting projects, etc. The user interface 108 can also include features to allow the user to add or remove files, projects, documents, or any items. For example, the user can add preference files, code blocks, applications, etc. In some cases, the toolbar objects can be used to modify the items area 602 and/or the display area 606, add or remove items from the items area 602 and/or the display area 606, or perform actions associated with items in the items area 602 or projects in the display area 606.

Figure 6A:
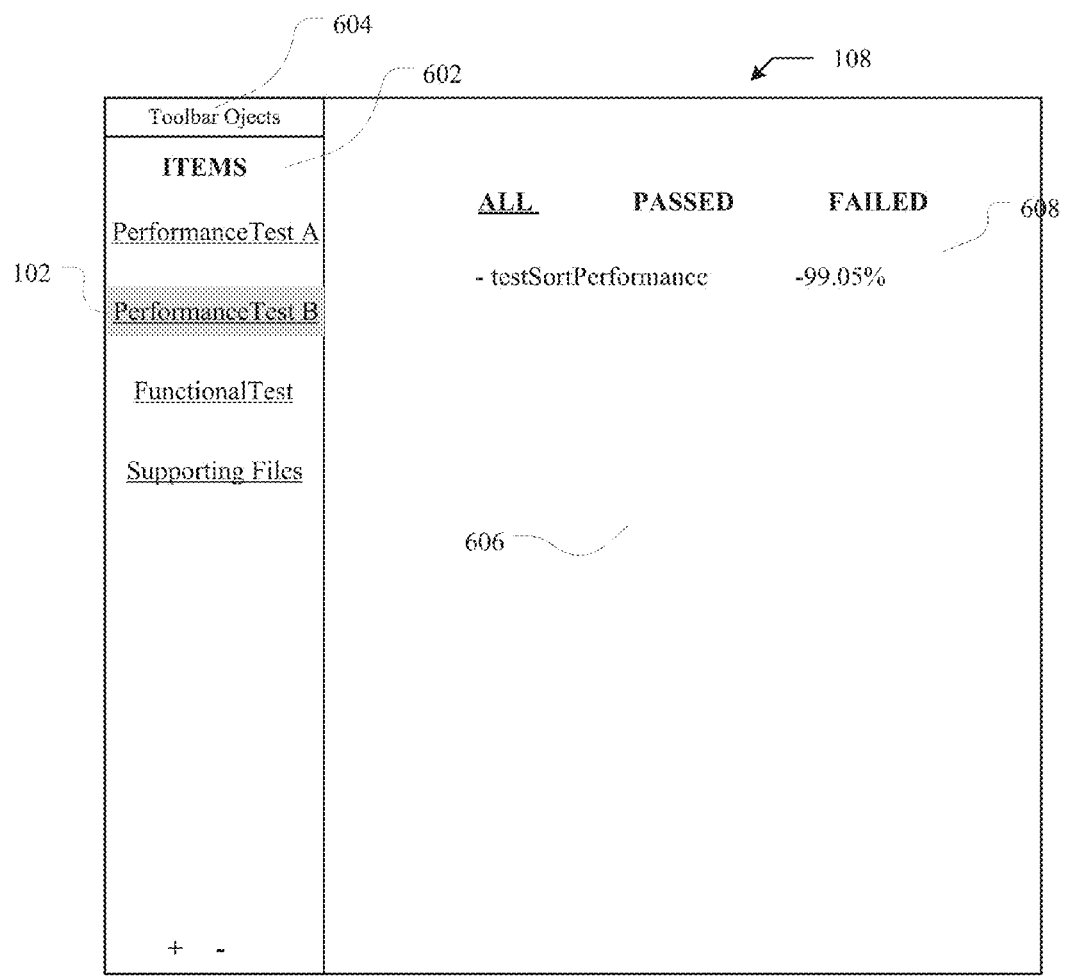
Figure 6B:
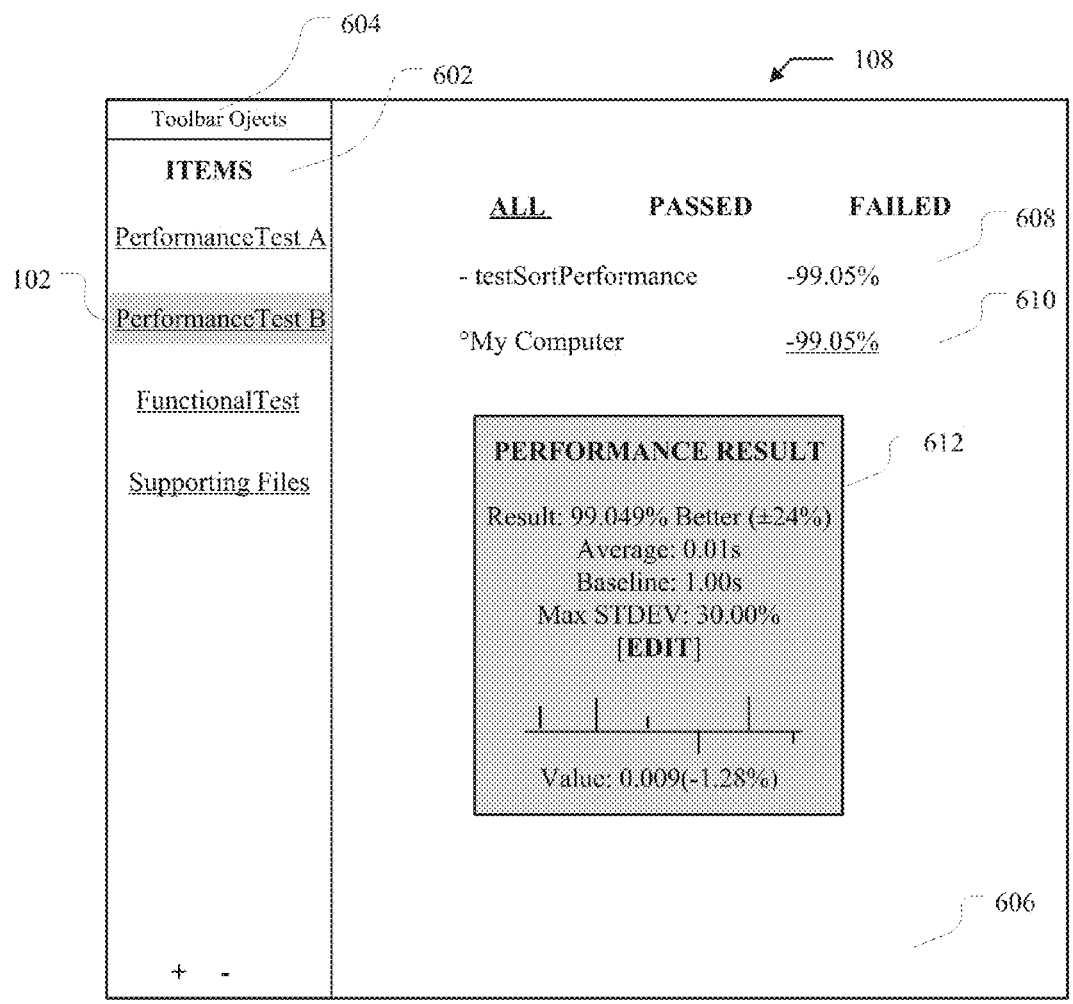

Referring to FIG. 6B, the testing information 608 can be selected to expand the information for additional details. For example, the testing information 608 can be expanded to present additional testing details 610. The additional testing details 610 can include information about the device used to perform the specific test associated with the testing information 608. This can give the user insight into the specific performance of the test on specific devices. For example, the additional testing details 610 can list the device (e.g., computer or system) used to perform the tests and the results obtained for the tests executed on the listed device.

If the test is performed on multiple devices, the different devices can be displayed along with their corresponding testing information. This way, the user can compare how a particular test performed on different devices, and make any necessary tweaks to improve the code for running on the specific devices. For example, if a test is performed on a desktop and then again on a mobile device, the user can compare how the test performs on the desktop with respect to the mobile device. As another example, if the test is performed on multiple devices running different operating systems or hardware components, the user can determine how the tests perform on the different operating systems or hardware components.

In addition, the user interface 108 can also present a window 612 with specific details about a test. The window 612 can be a pop-up window or an area within the user interface 108, for example. Moreover, the window 612 can be a results window, such as results window 400 illustrated in FIGS. 4A-C. The window 612 can include various types of testing results and information. For example, the window 612 can include a results value, a result relative to the baseline, a percent variation, an average testing result, a baseline result, a maximum standard deviation configured for the test, and/or an illustration depicting other tests, such as a graph of previous test results. Further, the window 612 can include objects to allow the user to edit information and parameters, save or cancel information and parameters, add new information or parameters, etc.

Referring to FIG. 6C, the user interface 108 can display a history 614 of results for selected test projects associated with the selected test 102. The history 614 can be displayed within the display area 606 in the user interface 108. Moreover, the history 614 can list the tests performed, and any information or results associated with the listed tests. For example, the user can select "Project 2" from the user interface 108 to view the tests performed for that project, as well as any testing information associated with it.

The history 614 can include the date of the test performed for one or more of the listed tests; the status of the test, such as pass or fail; a result, such as a value or percentage; an alert; a message; an average; a deviation; a baseline value or percentage; etc. The result presented in the history 614 can depend on the type of test performed. For example, on a speed test, the result can include a time and/or a percentage deviation. On the other hand, on a memory test, the result can include a size or number of objects in memory, a number of blocks of memory used, a percentage of memory space utilized, an amount of time of memory usage, memory performance information, etc.

The projects listed in the display area 606 can include any item tested via the test engine 106, any item added to the user interface 108 for testing, and any testing parameters or settings. For example, the projects can include a configured test executed or added to the user interface 108. The configured test can include a module, a block of code, a portion of software, a file, a library, a folder, a preference list, an application, a script, testing parameters, baseline test information, etc.

In some cases, the items or information in the history 614 can be sorted within the display area 606. For example, the projects presented in the history 614, as well as any tests associated with the projects, can be sorted by date, status, result, name, etc. The tests or projects can also be ranked by performance. For example, the tests with the best results can be listed first in descending order. This way, the user can view the history 614 and get a visual sense of the patterns and performance over a period of time.

The user interface 108 can also filter items from the history 614. For example, the user interface 108 can filter failed or passed tests, so only failed or passed tests are presented by the history 614 in the display area 606. As another example, the user interface 108 can filter tests by a value or percentage associated with the tests. Here, if the user only wants to view information for those tests that performed below a threshold value, the user interface 108 can filter the results in the history 614 to only present those tests having performed below the threshold value.

The user interface 108 can also present or list other projects in the display area 606. The projects displayed in the display area 606 can be associated with the selected test 102. Here, the user can select any item from the items area 602 to view the history and information associated with that selected item. For example, the user can select "Project 1" from the user interface 108 to view the tests associated with that project. The user interface 108 can then present the history associated with that project, which, as previously explained, can include a list of tests for that project, dates for the tests, results for the tests, values for the tests, messages or notifications, alerts, etc.

Referring to FIG. 6D, the history 614 can expand to present specific testing instances 616 for a test. For example, Test C can be expanded to display specific testing details for each instance of the test executed. This way, the user can obtain a more granular representation or view of the testing details in the history 614. The testing instances 616 can include a list of tests executed for the selected test, as well as an indication of the specific device used to execute each test. Thus, the testing instances 616 can provide details regarding which device was used in executing a particular test, as well as any testing statistics or details for that test. In some cases, if a test is performed on multiple devices, the testing instances 616 can present the testing results and/or parameters for each specific test performed on each device.

The testing information presented by the testing instances 616 can include, for each test, the device used to execute the test, the operating system running, the status of the test (i.e., pass or fail), the percentage deviation, the difference with respect to an average, the actual testing value or metric obtained, and so forth. The testing information can be sorted based on one or more specific criteria, such as device associated with the test, result value, percentage, status, etc.

In some embodiments, the testing instances 616 can be automatically presented with the history 614. For example, when the history 614 is presented on the user interface 108, each testing instance can be automatically expanded to show any additional details for each test having additional details. In other embodiments, the history 614 can be presented in a collapsed manner where the user can select a test in the history 614 to expand it to include the testing instances 616 for that selected test. In other words, a user can select Test C to view additional details. In response, the history 614 can expand to show the instances 616 for Test C. Here, the instances 616 can include any testing details associated with Test C, such as a listing of tests performed, results obtained, parameters used, etc.

Figure 7:
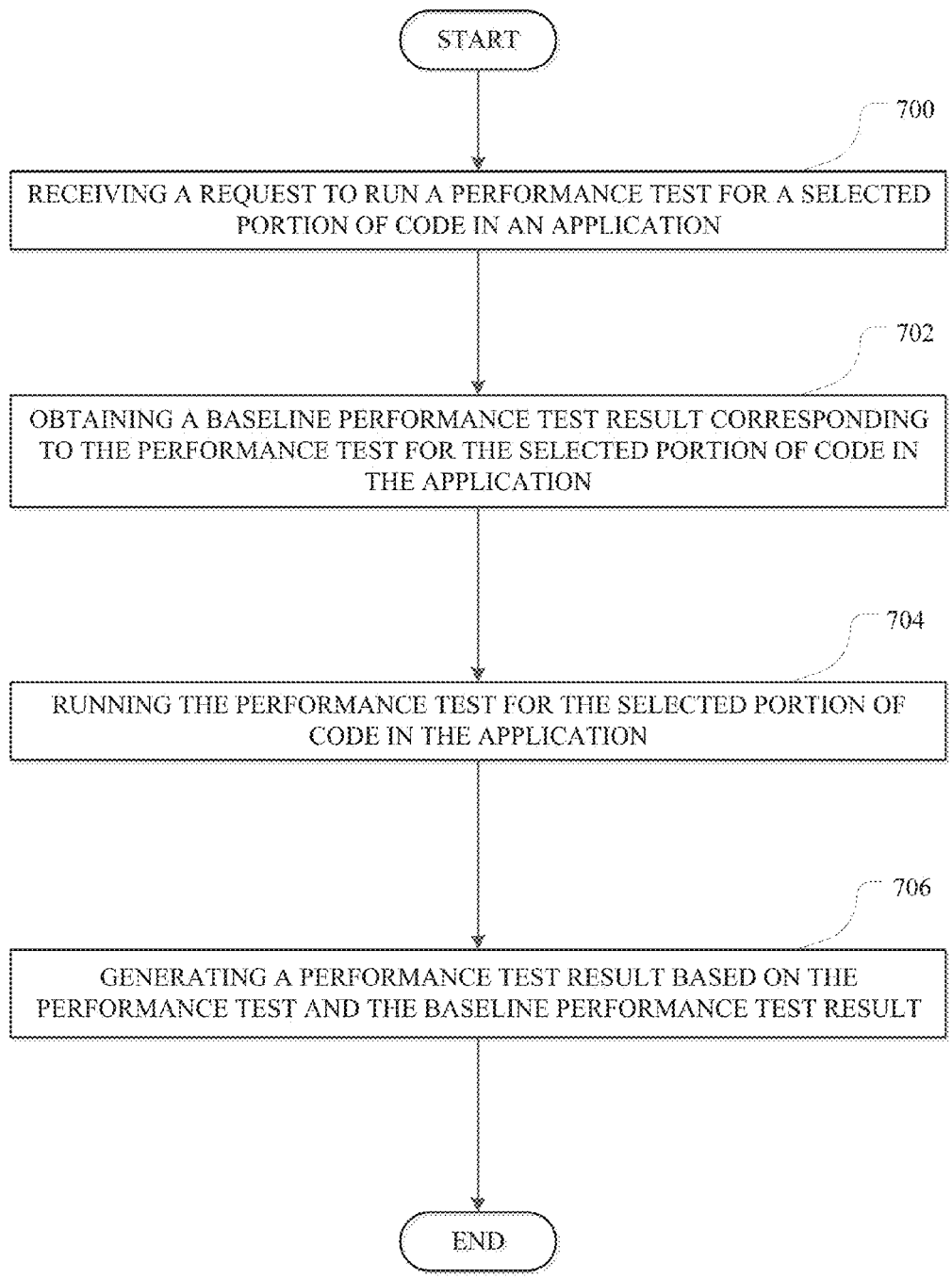
FIG. 7 illustrates an example method embodiment.

Having disclosed some basic system components and concepts, the disclosure now turns to the example method embodiment shown in FIG. 7. For the sake of clarity, the method is described in terms of a test engine 106, as shown in FIG. 1, configured to practice the steps in the method. The steps outlined herein are exemplary and can be implemented in any combination thereof, including combinations that exclude, add, or modify certain steps.

The test engine 106 first receives a request to run a performance test for a selected portion of code in an application (700). For example, a user can select a portion of code and initiate a performance test of the portion of code by the test engine 106. The test engine 106 can then obtain a baseline performance test result corresponding to the performance test for the selected portion of code in the application (702), and run the performance test for the selected portion of code in the application (704). Next, the test engine 106 can generate a performance test result based on the performance test and the baseline performance test result (706). The test engine 106 can then present the test result and/or the baseline performance test result via a graphical user interface, or send the test result and/or baseline performance test to a remote device for presentation.

The test engine 106 can receive the request to run the performance test via a graphical user interface. In some configurations, the graphical user interface can include a window or an area where a user can drag and drop, select, input, link, or browse for, a portion of code that the user wants to test. Moreover, the graphical user interface can serve as an interface for a software testing tool that serves as the testing engine. In some embodiments, the graphical user interface can be a user interface 108 as illustrated in FIGS. 3A-C and 6A-D. In other embodiments, the graphical user interface can be a display 500 as illustrated in FIG. 5. Moreover, the graphical user interface can include a results window 400 as illustrated in FIGS. 4A-C.

The graphical user interface can receive specific settings or commands from the user to control the testing tool, modify parameters, define output results, store testing information, manipulate the presentation of testing information, etc. For example, the user can define specific parameters or testing metrics, such as speed or memory usage, for the performance test through the graphical user interface. As another example, the user can specify what information should be presented in the output, such as the test results, the baseline test results, previous test results, a comparison of the test results and the baseline test results, a performance message or alert, a standard deviation, pass or fail results, errors, etc.

In some cases, the graphical user interface can present the test results along with the baseline test results and a comparison of the test results with the baseline results. The comparison can include a deviation between the test results and the baseline results, a percentage difference between both results, a message specifying whether the test results fall within a threshold difference from the baseline results, an indication of the performance variation between the test results and the baseline results, a difference between the test results and an average result, etc. For example, the comparison can indicate the difference in seconds or minutes between a current result for a speed test and a baseline result for the same speed test. The comparison can be illustrated as a percentage, a number value, a message, a combination, etc. The comparison can also provide an indication of the test result with respect to the baseline as well as any other previous tests performed. For example, the comparison can indicate the percent difference between the baseline as well as the average.

The user can also configure the format or view of the output presented in the graphical user interface. For example, the user can set the graphical user interface to present one or more test results in a graph, table, or any representation charting the results over a period of time. Moreover, the user can set the period of time that should be captured in the output. For example, the user can specify that the output should include test results and/or any other information for a specific period of time, such as a day, a week, a month, or a year.

In some embodiments, the test engine 106 does not obtain a baseline result on the first run, but simply runs the performance test and presents and stores the results. Here, the test engine 106 can allow a user to either specify a baseline value for future tests, or select a representative test result and designate that as the baseline. For example, if the test engine 106 performs 12 performance tests for a block of code and the user believes the results from test number 4 are representative of what the results should be, the user can specify to the test engine 106 that the results from test 4 should be used as the baseline. Thereafter, future test results can be measured, compared, and/or interpreted in view of the baseline result selected by the user.

However, in other embodiments, the test engine 106 can automatically generate a baseline result in the first (or any other) test of the particular block of code. Here, the test engine 106 can calculate the baseline performance test result by running the performance test multiple times and identifying an average or median result of the multiple tests. For example, the test engine 106 can run the performance test 10 times to obtain 10 separate test results, and set the baseline to the average of the 10 test results. In some cases, the user can specify, through the graphical user interface, the number of tests or the period of time for running the tests, used to generate the baseline.

Moreover, the tests used to generate the baseline can be performed on the test engine 106 and/or any number of separate devices. For example, in some cases, the tests can be performed on a single device to tailor the baseline to that device. Yet in other cases, one or more of the tests can be performed on one or more separate devices to obtain a baseline that reflects varying capabilities. Moreover, in some configurations, the baseline can account for system capabilities, such as memory and processing speed, and the test engine 106 can factor in the system capabilities in reporting a result, such as a pass, a fail, or an error. When presenting test results, the test engine 106 can also present a history of test results based on tests executed on a particular device but, in some cases, the history can also include tests performed on separate devices. Indeed, the test engine 106 can organize the tests by device or compare the results obtained on different devices to obtain insight into how the varying capabilities of the different devices affect the results.

As previously mentioned, the test engine 106 can report various types of results, including scores, notifications, alerts, pass results, fail results, errors, averages, deviations, etc. In some configurations, the test engine 106 can report a test score and/or a pass or fail notification. The pass or fail notification can be based on the baseline results. For example, the test engine 106 can be configured to report a failed test if the test results vary from the baseline within a threshold tolerance. Likewise, the test engine 106 can be configured to report a pass if the test results are within a tolerance relative to the baseline, for example.

In some cases, the test engine 106 can calculate a standard deviation of the test results used to obtain the baseline result. The test engine 106 can then use the standard deviation to calculate a pass or fail, and/or report the standard deviation as part of the test results to provide the user with context for the results. For example, the test engine 106 can report a failed test if the difference between the test results and the baseline results are greater than the standard deviation, and report a pass result if the difference is less than the standard deviation. To this end, the user can configure a maximum or minimum standard deviation that should be considered when reporting results.

Furthermore, the user can set a tolerance or threshold which the test engine 106 can use to determine if the test results are a pass or a fail. Here, the user can specify a difference, which can be relative to the standard deviation, between the test results and the baseline results that should trigger a fail or a pass.

Figure 8B:
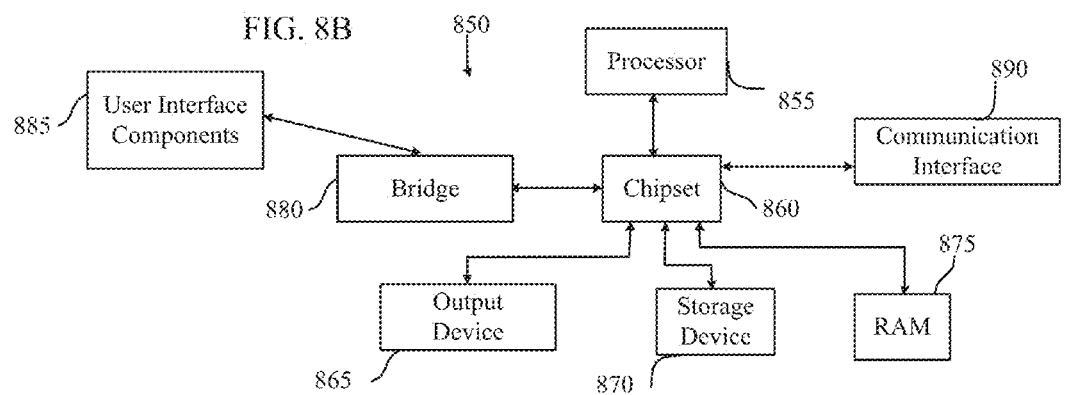
FIG. 8A and FIG. 8B illustrate example system embodiments.
Figure 8A:
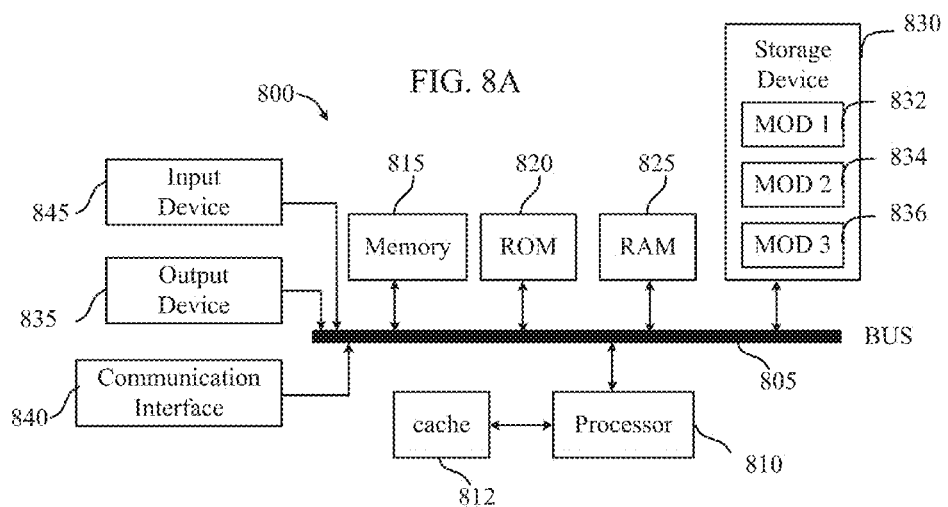

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
   receiving, by an input area of a graphical user interface, software source code for an application;
   receiving, by the input area of the graphical user interface, a selection of a portion of the code for testing, including selecting starting and stopping points in the portion of the code for performance testing;
   receiving a request to run a performance test for the selected portion of the code in the application;
   obtaining a baseline performance test result corresponding to the performance test for the selected portion of code in the application, wherein the baseline performance test is an average test result based on a plurality of results obtained from a plurality of performance tests;
   running the performance test for the selected portion of code in the application; and
   generating a performance test result based on the performance test and the baseline performance test result, the performance test result indicating a current performance status of the selected portion of code with respect to the baseline performance test result; and
   calculating a standard deviation of the plurality of performance test results; and
   presenting on the graphical user interface the performance test result and the standard deviation.

2. The computer-implemented method of claim 1, wherein determining the average test result yields an error when respective results from a threshold number of the plurality of performance tests indicate a threshold variance, and wherein the baseline performance test result comprises the error when determining the average test result yields the error.

3. The computer-implemented method of claim 1, wherein receiving the request to run the performance test for the selected portion of code in the application comprises:
   receiving, via the graphical user interface, the selected portion of code; and
   receiving, via the graphical user interface, a user input configured to trigger the performance test to run.

4. The computer-implemented method of claim 3, further comprising determining a performance status for the selected portion of code over a period of time by:
   receiving a plurality of requests over the period of time to run the performance test for the selected portion of code;
   running, over the period of time, a plurality of performance tests for the selected portion of code; and
   generating performance data for the selected portion of code based on the plurality of performance tests and the baseline performance test result, wherein the performance data indicates a performance of the selected portion of code over the period of time.

5. The computer-implemented method of claim 3, further comprising presenting, via the graphical user interface, at least one of the performance test result and the baseline performance test result.

6. The computer-implemented method of claim 5, further comprising:
   comparing the performance test result with the baseline performance test result to obtain a comparison; and
   presenting the comparison via the graphical user interface.

7. The computer-implemented method of claim 1, further comprising reporting an error when a difference between the performance test result and the standard deviation exceeds a threshold amount.

8. The computer-implemented method of claim 7, further comprising receiving, via the graphical user interface, a user-defined setting specifying a tolerance comprising the threshold amount, the user-defined setting triggering the error when the performance test result exceeds the tolerance.

9. The computer-implemented method of claim 1, wherein the performance test result comprises at least one of an execution time and a resource usage, and wherein the selected portion of code comprises one or more functions.

10. The computer-implemented method of claim 1, wherein the request comprises at least one performance metric to be tested, the method further comprising:
    receiving a second request to run a second performance test for the selected portion of code in the application;
    running the second performance test for the selected portion of code to obtain a second performance test result;
    updating the baseline performance test result based on the second performance test result; and
    presenting, via the graphical user interface, at least one of the second performance test result, the updated baseline performance test result, and a comparison of the second performance test result and the updated baseline performance test result.

11. A system comprising:
    a processor;
    a computer-readable storage medium having stored therein instructions which, when executed by the processor, cause the processor to perform operations comprising:
    receiving, by an input area of a graphical user interface, software source code for an application;
    receiving, by the input area of the graphical user interface, a selection of a portion of the code for testing, including selecting starting and stopping points in the portion of the code for performance testing;
    receiving a request to execute a software test for the selected portion of code in the application;
    executing the software test a plurality of times to obtain a plurality of test results;
    determining a baseline test result for the selected portion of code based on the plurality of test results;
    executing the software test again to obtain a test result;
    calculating a standard deviation of the plurality of test results; and
    presenting, via the graphical user interface, at least one of the test result, the baseline test result, the standard deviation and a comparison of the test result and the baseline test result.

12. The system of claim 11, wherein the software test comprises a performance test based on at least one user-defined performance metric.

13. The system of claim 12, wherein the computer-readable storage medium stores additional instructions which, when executed by the processor, cause the processor to perform an operation comprising presenting an error via the graphical user interface when a difference between the test result and the standard deviation exceeds a threshold tolerance.

14. The system of claim 13, wherein the computer-readable storage medium stores additional instructions which, when executed by the processor, cause the processor to perform an operation comprising receiving, via the graphical user interface, a user input defining the threshold tolerance for triggering the error.

15. The system of claim 11, wherein the computer-readable storage medium stores additional instructions which, when executed by the processor, cause the processor to perform operations comprising:
receiving the request and the selected portion of code via the graphical user interface;
receiving a second request to run a second performance test for the selected portion of code;
executing, over a period of time, the second performance test for the selected portion of code to obtain a second performance test result; and
generating performance data for the selected portion of code based on at least one of the performance test result, the second performance test result, and the baseline test result, wherein the performance data indicates a performance of the selected portion of code over a period of time associated with the performance test and the second performance test.

16. A non-transitory computer-readable storage medium having stored therein instructions which, when executed by a processor, cause the processor to perform operations comprising:
receiving, by an input area of a graphical user interface, software source code for an application;
receiving, by the input area of the graphical user interface, a selection of a portion of the code for testing, including selecting starting and stopping points in the portion of the code for performance testing;
receiving a request to run a software performance test for a block of code associated with the application, the request defining at least one performance metric for the software performance test;
based on the at least one performance metric, running the software performance test a plurality of times to obtain a plurality of test results;
calculating a baseline test result for the software performance test of the block of code based on the plurality of test results;
based on the at least one performance metric, running the software performance test another time to generate a current test result;
determining a standard deviation of the plurality of test results; and
presenting, via the graphical user interface, at least one of the current test result, the baseline test result, the standard deviation and a comparison of the current test result and the baseline test result.

17. The non-transitory computer-readable storage medium of claim 16, wherein the average is calculated by:
removing a first test result having a highest value with respect to each respective value from the plurality of test results;
removing a second test result having a lowest value with respect to each respective value from the plurality of test results; and
averaging a remaining set of test results from the plurality of test results, the remaining set of test results comprising the plurality of test results without the first test result and without the second test result.

18. The non-transitory computer-readable storage medium of claim 16, storing additional instructions which, when executed by the processor, cause the processor to perform operations comprising:
receiving a second request to run a second software performance test for the block of code;
running the second software performance test for the block of code to obtain a second current test result;
updating the baseline test result based on at least one of the current test result and the second current test result; and
presenting, via the graphical user interface, at least one of the second current test result, the updated baseline test result, and a comparison of the updated baseline test result and at least one of the current test result and the second current test result.

19. The non-transitory computer-readable storage medium of claim 16, storing additional instructions which, when executed by the processor, cause the processor to perform operations comprising:
reporting an error associated with the current test result when a difference between the current test result and the standard deviation exceeds a threshold, wherein the threshold is based on at least one of a user-defined tolerance and a size of the standard deviation.

20. A method comprising:
presenting, via a graphical user interface, an input area configured to receive software source code for an application to be tested by a software testing tool associated with the graphical user interface;
receiving, by the input area of the graphical user interface, software source code for the application;
receiving, by the input area of the graphical user interface, a selection of a portion of the code for testing, including selecting starting and stopping points in the portion of the code for performance testing;
executing a plurality of performance tests for the portion of code to obtain a current test result and a baseline test result, the current test result being based on at least one of the plurality of performance tests, and the baseline test result being based on a remaining set of the plurality of performance tests;
determining a standard deviation of the plurality of performance tests; and
presenting, via the graphical user interface, a view displaying at least one of the current test result the standard deviation and the baseline test result.

21. The method of claim 20, wherein executing the plurality of performance tests for the portion of code is performed via the software testing tool, and the method further comprising presenting, via the graphical user interface, a comparison of testing preferences used to perform the at least one of the plurality of performance tests and testing preferences used to perform the remaining set of the plurality of performance tests.

22. The method of claim 21, further comprising reporting an error via the graphical user interface when a difference between the current test result and the standard deviation exceeds a threshold, wherein the threshold comprises a tolerance based on at least one of a user-defined preference and a size of the standard deviation.

* * * * *